United States Patent
Claussen et al.

(10) Patent No.: US 7,808,946 B2
(45) Date of Patent: Oct. 5, 2010

(54) AUTOMATED CONFIGURATION OF A BASE STATION ROUTER DEVICE

(75) Inventors: Holger Claussen, Swindon (GB); Lester Ho, Swindon (GB); Louis Gwyn Samuel, Swindon (GB); Hamid Reza Karimi, Swindon (GB)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 804 days.

(21) Appl. No.: 11/486,408

(22) Filed: Jul. 13, 2006

(65) Prior Publication Data

US 2008/0013477 A1    Jan. 17, 2008

(51) Int. Cl.
*H04W 4/00* (2009.01)
*H04W 36/00* (2009.01)

(52) U.S. Cl. ...................... 370/328; 455/436

(58) Field of Classification Search ................ 370/328, 370/348, 338; 455/435.1, 435.2, 435.3, 522, 455/440, 432.1, 69, 127.1, 434, 343.1, 436–439
See application file for complete search history.

(56) References Cited

U.S. PATENT DOCUMENTS

| | | | |
|---|---|---|---|
| 5,778,322 A | 7/1998 | Rydbeck | |
| 7,104,444 B2 * | 9/2006 | Suzuki | 235/380 |
| 7,239,884 B2 * | 7/2007 | Khawand et al. | 455/522 |
| 7,272,123 B2 * | 9/2007 | Wall | 370/331 |
| 2005/0148368 A1 | 7/2005 | Scheinert et al. | |
| 2005/0255890 A1 | 11/2005 | Nakada | |
| 2007/0140184 A1 * | 6/2007 | Garg et al. | 370/338 |

FOREIGN PATENT DOCUMENTS

WO    0001177    1/2000

OTHER PUBLICATIONS

International Search Report and Written Opinion of the International Searching Authority for International applciation No. PCT/US2007/015923, mailed Mar. 14, 2008.
International Preliminary Report on Patentability for International application No. PCT/US2007/015923, mailed Jan. 22, 2009.

* cited by examiner

*Primary Examiner*—Melody Mehrpour
(74) *Attorney, Agent, or Firm*—Carlson, Gaskey & Olds, P.C.

(57) ABSTRACT

A wireless communication system (20) allows for using base station router devices (30, 32) for in building communications using a mobile station (22). Automatically registering a base station router device and automatically configuring at least an initial parameter for a frequency, transmit power and definition code of the base station router device facilitates easy installation of such devices. In one example, the initial parameters are determined by a communication server associated with a wireless communication network. In another disclosed example, at least one of the initial parameters is automatically determined by the base station router device.

14 Claims, 2 Drawing Sheets

AUTOMATED CONFIGURATION OF A BASE STATION ROUTER DEVICE

FIELD OF THE INVENTION

This invention generally relates to communications. More particularly, this invention relates to wireless communications.

DESCRIPTION OF THE RELATED ART

Wireless communication systems are well known and in widespread use. Most systems allow subscribers to use mobile stations to conduct voice communications. In the recent past, more features have become available such as data communications along with other enhanced capabilities of wireless communications systems. It has become desirable for many subscribers to be able to use their mobile station as a primary communication device. In many situations, it has not been possible to replace the line-based telephone system in a building because of an inability to achieve sufficient radio frequency communications from inside the building to wireless communication network equipment located outside. There are RF losses associated with signals trying to penetrate through walls, for example.

One proposal at expanding wireless communication capability is to provide signaling devices within buildings that allows an individual to use a mobile station in a more reliable manner whether the mobile station is inside or outside the building. For example, it has been proposed to use base station router devices within buildings for interfacing between a mobile station and a wireless communication network so that a subscriber achieves reliable communications within a building. Another reason to consider such signaling devices is to support increased data rates with low interference generated for other mobiles. This is possible due to the much smaller path-loss to a Home-BSR as a result of the usually small distance to the mobile. This allows a more efficient use of the operator's frequency spectrum.

With a proliferation of such base station router devices, various challenges become apparent. One issue is how to render such devices easy to install for the average consumer. Traditionally, adding base stations to a wireless communication system has been a lengthy, expensive and labor-intensive process. Adding home base stations within buildings can improve the spectrum utilization but to be feasible, must be simpler than what is now required to add base stations in the conventional manner. Additionally, where multiple access points such as 802.11x access points are deployed, there typically will be low efficiency especially where technically inexperienced users are installing the access points. This is because it is necessary to properly plan frequency use and power levels to achieve a desirable efficiency level. Without appropriate training or experience, the average consumer will not be able to accomplish that end.

It is desirable to provide an approach to installing new home base station router devices that will render them easy to install and still accomplish the technical adjustments necessary to efficiently use the available spectrum. This invention addresses that need.

SUMMARY OF THE INVENTION

An exemplary method of communicating includes registering a newly installed base station router device and automatically configuring the device including initializing a parameter for frequency, power and a definition code for the device.

In one example, the registration includes information regarding the device and its location. In such an example, the initially configured parameters take into account information regarding other wireless communication devices such as base stations or other base station router devices in the vicinity of the newly installed device. This approach facilitates avoiding interference and avoiding undesirable duplication of device definition codes (e.g., scrambling codes or PN offsets), for example.

In one example, the registration occurs over a line-based backhaul connection between the base station router device and the wireless communication network. Allocating backhaul in this manner preserves the wireless resources of the communication network. One example registration process includes providing information regarding the base station router device identification code from the manufacturer or licensor, location information regarding the place of the installation, owner name and at least one cell phone number that is authorized for communication through the base station router device. In some examples, the owner of the base station router device can also select billing options for handling communications that are handled by the base station router device.

In one example, an appropriate portion of the wireless communication network initializes the parameters and communicates them to the base station router device. In another example, the base station router device includes the ability to initialize at least one of the parameters, which becomes initialized responsive to completion of the registration process.

Once the registration and initialization are complete, an appropriate portion of the wireless communication network stores corresponding information that is then useful for automatically configuring subsequently installed base station router devices.

The automated process of disclosed example embodiments facilitates easier proliferation of home base station router devices.

The various features and advantages of this invention will become apparent to those skilled in the art from the following detailed description. The drawings that accompany the detailed description can be briefly described as follows.

DETAILED DESCRIPTION

The following examples demonstrate how an embodiment of this invention provides for automatically registering and configuring base station router devices in a manner that facilitates easy installation of such devices. By automatically configuring at least a definition code, frequency and transmit power of base station router devices, the disclosed examples efficiently manage network resources to allow the proliferation of in-building wireless communication devices while avoiding the requirement that owners or installers of such devices go through a technically complex installation process.

Figure 1:
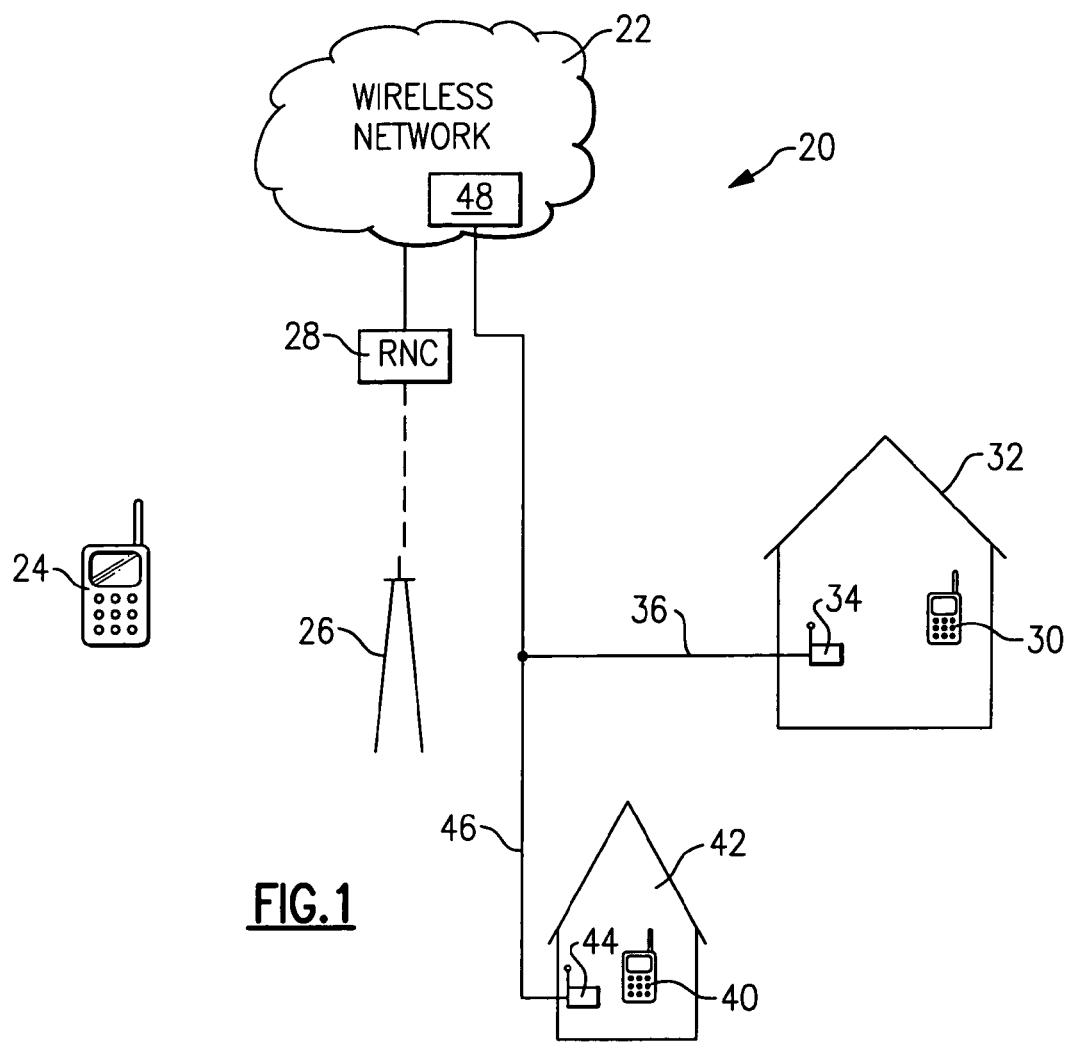
FIG. 1 schematically illustrates selected portions of a wireless communication system that is useful with an embodiment of this invention.

FIG. 1 schematically shows selected portions of a wireless communication system 20. A wireless network 22 includes known components to facilitate wireless communications on behalf of a plurality of mobile stations in a known manner. In this example a mobile station 24 is communicating with a base station (BTS) 26. A controller 28, which in the illustrated example comprises a radio network controller (RNC), facilitates communications on behalf of the base station 26 and the mobile station 22 in a known manner.

Another mobile station 30 is within a building 32. In some circumstances, the mobile station 30 within the building 32 may not be able to establish an adequate link with the BTS 26 even though it is geographically located within the macrocell coverage area of the BTS 26. The building walls, for example introduce radio frequency (RF) losses that prevent an adequate link.

The illustrated example includes a base station router device (BSR) 34 that wirelessly communicates with the mobile station 30. The BSR 34 provides adequate RF coverage for at least the mobile station 30 within at least a portion of the building 32. The BSR 34 also provides economic advantages and can improve the overall efficiency of use of the provider's frequency spectrum. In one example, the BSR 34 is an in-home router device used by the subscriber owning the mobile station 30 to facilitate using the mobile station 30 from within the corresponding building 32 (e.g., the subscriber's home). Example BSR's include home-unit base stations or home gateway base stations. Other pico-cell devices may be considered BSRs.

The BSR 34 communicates with the network 22 over a line-based connection 36. In one example, a broadband connection such as DSL is used. The illustrated connection is useful for backhaul communications between the BSR 34 and the network 22.

Another mobile station 40 is in a building 42 relatively nearby the building 32. Another BSR 44 is included in the building 42 and in communication with the network 22 over a line-based backhaul connection 46. The BSR 44 functions within the building 42 like the BSR 34 does within the building 32. It is worth noting that the BSRs 34 and 44 may also provide RF coverage in an area outside of the buildings in some circumstances (in-building use is described for purposes of illustration).

A communication server 48 is associated with the network 22. In one example, the communication server 48 is a device dedicated to facilitating the operation of the BSRs 34 and 44 for communication with appropriate portions of the system 20. The communication server 48 automatically registers the BSRs upon installation (or a first use in a new location in the event that a previously used BSR is brought from another remote location, for example). The communication server 48 also facilitates automatically configuring at least initial parameters for operation of the BSRs upon successful registration.

Figure 2:
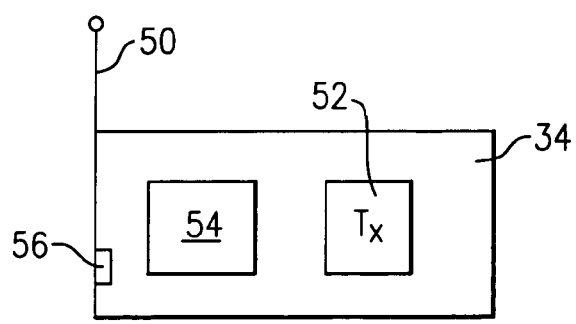
FIG. 2 schematically shows selected portions of one example base station router device.

FIG. 2 schematically shows selected portions of the example BSR 34. In this example, the BSR 34 includes an antenna 50 and a transceiver portion 52 that operate in a generally known manner for communicating with at least the mobile station 30 when the mobile station 30 is within an appropriate range of the BSR 34. A controller portion 54 is responsible for maintaining operating parameters that govern the operation of the BSR 34. Example parameters are described below. In some examples, the controller portion 54 receives the parameters or information regarding the parameters from the communication server 48. In other examples, the controller portion 54 automatically determines at least one of the operating parameters independent of the communication server 48.

The example BSR 34 also has a communication port 56 for establishing the communication link 36 with the communication server 48 or another appropriate portion of the network 22. In one example, a user of the BSR 34 need only connect the BSR 34 to an appropriate power source and make a connection to an Ethernet or DSL line with a commercially available connector to initiate an automated registration and configuration process for the BSR 34. The same is applicable to the BSR 44.

Figure 3:
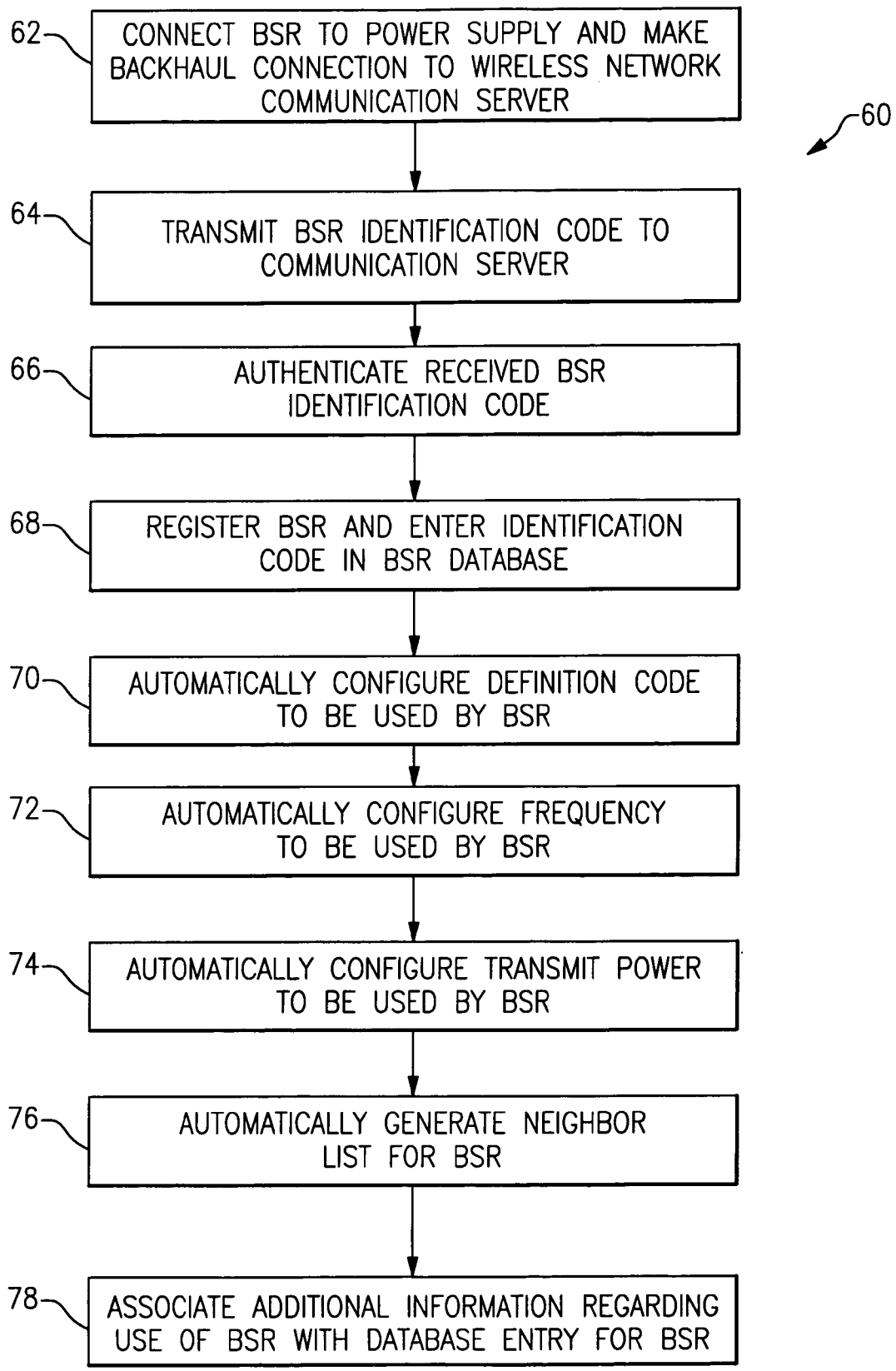
FIG. 3 is a flowchart diagram summarizing an example approach to automatically configuring a base station router device.

FIG. 3 includes a flowchart 60 that summarizes one example automated registration and configuration technique that is useful with an embodiment of this invention. The automated registration process begins at 62 responsive to a user, owner or installer turning on power for the BSR 34 and making the backhaul connection 36 through the communication port 56, for example. Once this occurs, the BSR 34 provides a BSR identification code to the communication server 48 at 64. This transmission occurs over the line-based backhaul connection 36 in the illustrated example. In one example, the BSR 34 provides the BSR identification code each time it is powered up. In another example, the BSR 34 provides the identification code responsive to an inquiry from the server 48, which detects the active communication link 36.

In one example, the identification code comprises a digital certificate that is hardcoded into the BSR. In another example the BSR identification is from a SIM card that is purchased with or separately from the BSR.

Once the BSR identification code is received by the communication server 48, authentication occurs at 66. In the illustrated example, the server 48 automatically authenticates the received BSR identification code. If it is valid, which can be determined in an manner appropriate for a particular configuration, then the BSR is registered. The example of FIG. 2 includes storing an indication of the identification code of the BSR in a database at 68.

Once registered, the BSR can be automatically configured for operation at the installation location in a manner that is consistent with efficient operation within the environment of the surrounding wireless communication system. Automatically configuring the BSR in this example includes setting at least initial parameters for a definition code (e.g., scrambling code or PN offset) to be used by the BSR at 70, a frequency to be used by the BSR at 72 and a transmit power to be used by the BSR at 74.

In one example, the initial parameters set at 70, 72 and 74 are all determined by the communication server 48. The definition code is chosen in one example based on information that the server 48 has in the database containing information regarding registered BSRs. The server 48 in this example selects a definition code that will not conflict with those used by BTSs or other BSRs in the vicinity of the newly registered BSR. The operating frequency set at 72 will typically be dictated by a license holder such as a PLMN operator.

The transmit power level will be configured for pilot and data communications. In one example, the transmit power is initially set low and can be later adapted during operation based on mobile station measurements, for example, if necessary. In another example, a desired transmit power is determined by the communication server 48 based upon information regarding other wireless communication devices in the vicinity (e.g., the BTS 26 and the BSR 44 assuming that the BSR 44 has already been registered).

The example of FIG. 2 includes automatically generating a neighbor list for the BSR 34 at 76. This is accomplished in one example based on information available to the server 48 from the database maintained by the server regarding the area within which the BSR 34 was installed.

The example of FIG. 2 includes a step at 78 where additional information is included in the database in association with the entry for the newly registered BSR. Additional information can be included regarding a location of the BSR, mobile stations that are authorized for communicating with the BSR, selected options for handling billing for communications facilitated by the BSR (e.g., charge for calls including the BSR to the BSR account or the involved mobile station's account) and other information that may be useful during the operation of the BSR. One example includes providing a secure Internet website that a user of the BSR can access to provide the additional information by using another device such as a computer that may be separate from the BSR 34.

In another example, the BSR has the ability to automatically configure at least one of the initial parameters independent of the server 48 once the BSR has been successfully registered. In some examples, the server 48 is responsible for determining some of the parameters and the BSR others. Whether the BSR independently determines an initial parameter or receives information regarding the parameter from the server 48, the controller portion 54 ultimately automatically configures the parameter for BSR operation.

When the BSR automatically determines a parameter, it reports the resulting parameter to the server 48 for inclusion in the database regarding the BSRs.

In one example, the BSR 34 includes a SIM card that has a preset indication of the appropriate frequency to be used by the BSR 34. The BSR in such an example automatically configures the frequency responsive to that information. The operating frequency will typically be determined by the appropriate licensor (e.g., PLMN operator).

In one example, the BSR 34 initially selects a definition code. This may be done randomly, for example. The BSR 34 then begins transmitting using the selected definition code at a relatively low power that is sufficient to establish a link with a mobile station in close proximity to the BSR 34. The low power is selected to minimize the possibility of introducing interference for any nearby BSRs or BTSs. If a connection is not possible within a predetermined time, this may be due to a poorly selected initial definition code.

If no connection was made, the BSR 34 selects a second definition code and continues attempting to establish a link with a nearby mobile station (e.g., within the building 32). If still unsuccessful, another definition code is selected.

The BSR 34 communicates with a successfully connected mobile station to obtain information regarding the surrounding wireless communication environment. For example, the mobile station measurement capabilities provide information regarding definition codes of nearby BSRs and BTSs. The BSR 34 can then automatically configure a neighbor list and select a definition code that will not cause interference or false handovers that might otherwise occur if the selected definition code were the same as a neighboring device.

The transmit power can be automatically configured based on measurements taken by the mobile station that are communicated to the BSR 34.

In another example, the BSR 34 has the ability to detect and measure devices within a designed range of the location of the BSR 34 so that the connection with the mobile station is not necessary.

In one example, the communication server 48 initiates a software update for any mobile stations authorized to communicate through the registered BSR. The software update in one example enables the mobile station to display when successful connection with the BSR is active. In one example, the need or ability to receive an appropriate software update is communicated to a mobile station through a short message service (SMS) message. The update may be obtained through a download directly to the mobile station or a visit to an appropriate vendor, for example.

Automating the registration and configuration process according to one of the above examples makes it possible for the average consumer of a BSR to readily and easily install the BSR in a desired location. The above techniques are useful for initial registration and configuration and for updating or changing the configuration over time. For example, after an initial configuration, a plurality of other BSRs or a new BTS may be employed in the vicinity of a previously registered BSR. Such devices may bring about changes to the surrounding wireless communication environment that warrant adjusting the initial parameters to improve or maintain a desired efficiency level, for example. One example implementation of this invention includes a server 48 that monitors changes to the BSR database and automatically determines when updating one or more parameters of one or more BSRs in the database is warranted.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of initiating a base station router device, comprising:
   automatically registering a base station router device;
   automatically configuring at least an initial parameter for a definition code, a frequency and a transmit power of the registered base station router device;
   configuring at least the base station router device definition code using the base station router device by gathering information regarding other wireless communication devices in a vicinity of the base station router device;
   selecting a first base station router device definition code;
   transmitting at a low power level adequate to connect with a mobile station in very close range of the base station router device;
   determining whether a connection with a mobile station is made;
   gathering the information from the mobile station if the connection is made; and
   selecting a second base station router device definition code if the connection is not made and performing the transmitting step using the second base station router device definition code.

2. The method of claim 1, comprising
   communicating at least a base station router device identification code between the base station router device and a communication server over a line-based backhaul connection between the base station router device and the communication server.

3. The method of claim 2, comprising
   receiving the base station router device identification code at the communication server;
   authenticating the received base station router device identification code; and
   creating an entry in a base station router device database regarding at least the authenticated base station router device identification code.

4. The method of claim 3, comprising
receiving information regarding at least one of
   a location of the base station router device,
   a mobile station identifier of a mobile station having permission to communicate through the base station router device, or
   a billing preference for use of the base station router device; and
including an indication of the received information in the base station router device database in association with the authenticated base station router device identification code.

5. The method of claim 4, comprising
providing a internet website for a user of the base station router device to submit the information.

6. The method of claim 2, comprising
transmitting the base station router device identification code to the communication server; and
transmitting information regarding at least one of
   a location of the base station router device,
   a mobile station identifier of a mobile station having permission to communicate through the base station router device, or
   a billing preference for use of the base station router device
to the communication server.

7. The method of claim 6, comprising
transmitting the base station router device identification code over a line-based connection between the base station router device and the communication server; and
transmitting the information using a second communication device distinct from the base station router device.

8. The method of claim 1, comprising
configuring the at least initial parameters using a communication server; and
communicating the at least initial parameters to the base station router device.

9. The method of claim 8, comprising
determining the at least initial parameters from information regarding other wireless communication devices in a vicinity of the base station router device.

10. The method of claim 9, comprising
determining a neighbor set of the base station router device based on the information regarding other wireless communication devices in a vicinity of the base station router device; and
communicating the determined neighbor set to the base station router device.

11. The method of claim 1, comprising
configuring the at least initial parameters at the base station router device.

12. The method of claim 11, comprising
reporting the configured at least initial parameters to a wireless network.

13. The method of claim 1, comprising
subsequently automatically updating at least one of the at least initial parameters.

14. The method of claim 1, comprising
performing the registering and configuring prior to a first use of the base station router device at a current location of the base station router device.

* * * * *